United States Patent [19]

Zarnegar

[11] 4,273,632

[45] Jun. 16, 1981

[54] AMINOPLAST-CONTAINING RADIATION CURING COATING COMPOSITIONS

[75] Inventor: Bizhan M. Zarnegar, Metuchen, N.J.

[73] Assignee: Mobil Oil Corporation, New York, N.Y.

[21] Appl. No.: 31,084

[22] Filed: Apr. 18, 1979

Related U.S. Application Data

[63] Continuation of Ser. No. 679,412, Apr. 22, 1976, abandoned.

[51] Int. Cl.$^3$ .............................. C08J 3/28; C08L 61/28
[52] U.S. Cl. ........................... 204/159.15; 204/159.22; 525/30; 525/518
[58] Field of Search ............... 427/54; 204/159.15, 204/159.16, 159.22, 159.23; 260/851, 856, 67.6 R; 525/518, 30

[56] References Cited

U.S. PATENT DOCUMENTS

| | | | |
|---|---|---|---|
| 3,267,174 | 8/1966 | Fry et al. | 260/848 |
| 3,352,806 | 11/1967 | Hicks | 260/856 X |
| 3,551,246 | 12/1970 | Bassemir et al. | 204/159.15 X |
| 3,816,557 | 6/1974 | Swanson et al. | 260/837 |
| 3,899,611 | 8/1975 | Hall | 427/54 |
| 3,959,207 | 5/1976 | Blank | 260/29.4 UA |
| 3,960,983 | 6/1976 | Blank | 260/67.6 R X |
| 4,003,868 | 1/1977 | Smith et al. | 260/21 |
| 4,140,605 | 2/1979 | Sano et al. | 525/518 |

*Primary Examiner*—John C. Bleutge
*Assistant Examiner*—A. H. Koeckert
*Attorney, Agent, or Firm*—Charles A. Huggett; Michael G. Gilman; Ronald J. Cier

[57] ABSTRACT

Liquid ultraviolet-curable coating compositions are provided by mixing a polyethylenically unsaturated compound, such as pentraerythritol triacrylate, with a liquid monoethylenically unsaturated hydroxy functional polyether, such as the reaction product of propylene oxide with hydroxyethylacrylate. An aminoplast is included in the mixture so that a thermal cure, following the radiation cure, will result in a cured coating having increased ability to withstand fabrication stresses without loss of adhesion to the substrate.

14 Claims, No Drawings

AMINOPLAST-CONTAINING RADIATION CURING COATING COMPOSITIONS

REFERENCE TO RELATED APPLICATIONS

This is a continuation of copending application Ser. No. 679,412, filed Apr. 22, 1976, now abandoned.

BACKGROUND OF THE INVENTION

1. Field of the Invention

The present invention relates to ultraviolet curing coating compositions, comprising liquid mixtures of polyethylenically unsaturated compounds and monoethylenically unsaturated hydroxy functional polyethers, which are modified to yield increased ability to withstand fabrication stresses without loss of adhesion to the substrate on elongation on ultraviolet cure followed by baking.

2. Description of the Prior Art

Ultraviolet curing liquid coating compositions based on polyethylenically unsaturated compounds are known. It would be desirable to extend the usefulness of these polyethylenically unsaturated compounds, and also to render the systems more fluid, by incorporating therein liquid monoethylenically unsaturated materials. One proposal for doing this is to employ liquid monoethylenically unsaturated hydroxy functional polyethers which can be produced by reacting a monoethylenic carboxylic acid or hydroxy ester thereof with one or more moles of an alkylene oxide, particularly propylene oxide. While the presence of the monoethylenically unsaturated hydroxy functional polyether provides liquid mixtures which cure rapidly to form a solid and nontacky film on ultraviolet light exposure, such coatings have little capacity to sustain elongation, even after baking. This causes fracturing of the coating and delamination when the coated substrate is fabricated.

SUMMARY OF THE INVENTION

In accordance with this invention, the liquid mixture of the ultraviolet curable polyethylenically unsaturated compound and a monoethylenically unsaturated hydroxy functional polyether (including appropriate photosensitizers rendering the composition sensitive to ultraviolet light) is modified by the inclusion of from 1-25%, preferably 3-20%, based on the total weight of ethylenically unsaturated material, of an aminoplast resin. These small proportions of aminoplast resin do not significantly impair the ultraviolet cure, while the presence of the aminoplast enables the achievement of a thermal cure after the ultraviolet cure has solidified the coating, and the thermal cure improves the fabrication of the coating.

DESCRIPTION OF SPECIFIC EMBODIMENTS

Referring first to the ultraviolet curing polyethylenically unsaturated materials which are employed, these are well known and are preferably illustrated by polyacrylates, such as trimethylolpropane di- or triacrylate or pentaerythritol polyacrylates, preferably those containing from 2.5-3.5 acrylate groups per molecule. While the above polyacrylates are normally liquid, more viscous or even solid materials are also contemplated, such as maleate or fumarate-containing unsaturated polyesters. Hydroxy functional polyacrylates are especially preferred, including epoxy diacrylates of various molecular weights, but which are preferably of low enough molecular weight to be liquid. These polyethylenically unsaturated materials are useful alone or in admixture with one another, and even saturated resins may be dissolved in the mixture to provide special properties. While polyacrylates are preferred, various other polyethylenically unsaturated products are also useful such as polymethacrylates, polynorbornene compounds, and the like. These may be used as such or upgraded in functionality and molecular weight as by reaction with a diisocyanate, such as toluene diisocyanate.

While ultraviolet curing is particularly contemplated, other forms of radiation, such as an electron beam, may be used, in which case photosensitizers are not needed.

The photosensitizers which are used herein are entirely conventional and may be of diverse type, as is known. The preferred photosensitizers are mixtures of a ketonic photoinitiator (such as benzophenone) or a benzoin ether (such as the methyl or butyl ether) with an appropriate co-initiator, such as an amine (e.g. methyldiethanolamine.) It is stressed that the selection of photosensitizers is not of prime significance herein since this invention is applicable to any ultraviolet curable polyethylenically unsaturated compound when it is appropriately photosensitized for ultraviolet cure in customary fashion.

The liquid monoethylenically unsaturated hydroxy functional polyethers which are used herein are more fully disclosed in U.S. Pat. No. 4,126,527, which is incorporated herein by reference. As described in that patent a monoethylenic carboxylic acid or hydroxy ester thereof, and especially acrylic acid or hydroxyalkylacrylate such as hydroxyethylacrylate, is reacted with sufficient alkylene monoxide (preferably propylene oxide) in the presence of a Lewis acid catalyst such as boron trifluoride etherate, to produce an hydroxy functional polyether, preferably containing an average of 2-10 ether groups per molecule. This invention will be illustrated by a polyether formed by adducting an average of 5 moles of propylene oxide onto one mole of hydroxyethylacrylate, but the invention is not so-limited.

These liquid monoethylenically unsaturated hydroxy functional polyethers are used to liquefy and/or reduce the viscosity of the polyethylenically unsaturated material and constitute from 10–90% of the mixture of unsaturated compounds, preferably 40–80% thereof. As will be apparent, the larger the proportion of the liquid unsaturated polyether, the more fluid the mixture, and the more the ultraviolet light-cured product will fail to sustain elongation.

The aminoplast resins which are used herein constitute a well known class of curing agents which are particularly reactive with hydroxy functionality. These are generally reaction products of excess aldehyde, usually formaldehyde, with polyamines such as urea, melamine or benzoguanamine, to provide a plurality of N-methylol groups which may be etherified with a lower alcohol ($C_1$–$C_4$) if desired to enhance solubility. Hexamethoxy methyl melamine will be used herein as illustrative since melamine-formaldehyde condensates are preferred.

The invention is illustrated in the Examples which follow, all parts and proportions herein being by weight unless otherwise specified.

EXAMPLE 1

Charged a dry reaction vessel fitted with a stirrer, thermometer, condenser, drying tube and two addition funnels with 928 g of hydroxyethyl acrylate (8.0 moles). Enough boron trifluoride etherate was added to initiate the reaction (approximately 1 ml). Then, with suitable cooling, added 2320 g of propylene oxide (40.0 moles) and additional $BF_3$-etherate (15–20 ml) at such a rate so as to maintain reaction temperature at 50° C. Total addition time was 2–2.5 hours. The temperature was maintained as high as possible by decreasing cooling. When the temperature dropped to about 40° C., the reaction mixture was sampled by gas chromatography. When the gas chromatographic analysis showed no propylene oxide, 0.32 g of hydroquinone (100 parts per million) and 2 ml triethylamine were added to stabilize the product. The product was a clear, light yellow liquid of 35–40 centipoise viscosity. A complete gas chromatographic analysis indicated the product to be a mixture of hydroxyethyl acrylate (~2%) and adducts thereof having the formula shown below in which x ranges from 1 to about 10, and has an average value of 5. NMR analysis of the product showed the correct ratio of vinyl protons to the remaining types of protons and infrared analysis showed the presence of hydroxyl, acrylate unsaturation and ether bands, all consistent with the following structure:

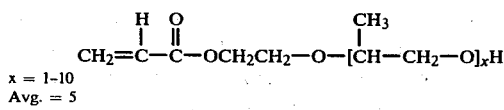

x = 1–10
Avg. = 5

EXAMPLE 2

The propylene oxide adducted hydroxyethyl acrylate of Example 1 was mixed with pentaerythritol triacrylate in a 7:3 weight ratio, and 5% of benzophenone and 2% of methyldiethanolamine were mixed in, the benzophenone serving as ultraviolet photosensitizer and the amine serving as a co-initiator. The liquid mixture so-provided was coated on an aluminum panel at a coating weight of 3 milligrams per square inch and the wet coating was cured by exposure to 2 Hanovia ultraviolet lamps having an intensity of 200 watts per inch. The coatings were moved beneath the lamps at a speed of 25 feet per minute and the cure was carried out in the presence of air. This converted the wet film to a hard, tack-free coating which was then post baked at 177° C. for five minutes, the post bake normally serving to maximize adhesion to the substrate. The panel with the cured coating thereon was then subjected to an impact wedge bend test after which Scotch brand adhesive tape was applied to the bend area and then removed. It was found that none of the coating remained on the bent portion of the panel.

The impact wedge bend test was carried out in accordance with ASTM D-3281-73.

EXAMPLE 3

The mixture of Example 2 was combined with 2% by weight of hexamethoxymethyl melamine (Cymel 301—American Cyanamide may be used). An aluminum panel was coated, cured, baked and bent in a manner similar to Example 2. After the bend was treated Scotch tape, 20% of the coating remaining on the bend.

EXAMPLE 4

The mixture of Example 2 was combined with 5% of the same melamine resin utilized in Example 3. An aluminum panel was coated and tested in the same manner as in Example 2 but, this time, 40% of the coating remained on the bend.

EXAMPLE 5

The mixture of Example 2 was combined with 10% of the same melamine resin utilized in Example 3. An aluminum panel was coated and tested in the same manner as in Example 2, and 50% of the coating remained on the bend.

It will be understood that the coating compositions of this invention may be used clear or pigmented, and that auxiliary agents such as wetting agents, flow control agents, and the like, may be employed.

I claim:

1. A liquid radiation-curable coating composition comprising a mixture of polyethylenically unsaturated compound, liquid monoethylenically unsaturated hydroxy functional polyether, and from 1–25%, based on the total weight of ethylenically unsaturated material, of an aminoplast, whereby a thermal cure following the radiation cure yields a cured coating which exhibits an increased ability to withstand fabrication stresses without loss of adhesion to the substrate.

2. A coating composition as recited in claim 1 in which said polyethylenically unsaturated compound is a polyacrylate.

3. A coating composition as recited in claim 1 in which said monoethylenically unsaturated hydroxy functional polyether is present in an amount of from 10–90% of the weight of the mixture of unsaturated compounds.

4. A coating composition as recited in claim 1 in which said monoethylenically unsaturated hydroxy functional polyether is present in an amount of from 40–80% of the weight of the mixture of unsaturated compounds.

5. A coating composition as recited in claim 1 in which said monoethylenically unsaturated hydroxy functional polyether is the reaction product of an alkylene monoxide with an hydroxyalkylacrylate to provide an average of 2–10 ether groups per molecule.

6. A coating composition as recited in claim 1 in which said aminoplast is a melamine-formaldehyde condensate.

7. A coating composition as recited in claim 6 in which said aminoplast is hexamethoxy methyl melamine.

8. A coating composition as recited in claim 1 in which said mixture includes photosensitizers for rendering the composition sensitive to ultraviolet light.

9. A coating composition as recited in claim 8 in which said photosensitizers include a ketonic photoinitiator and a co-initiator.

10. A liquid ultraviolet-curable coating composition comprising a mixture of polyacrylate, from 10–90% of the weight of the mixture of unsaturated compounds of a monoethylenically unsaturated hydroxy functional polyether formed by reaction of an alkylene monoxide with an hydroxyalkylacrylate, photsensitizers comprising a ketonic photoinitiator for rendering the composition sensitive to ultraviolet light, and from 1–25%, based on the total weight of ethylenically unsaturated material, of an aminoplast, whereby a thermal cure following the ultraviolet cure yields a cured coating which exhibits an increased ability to withstand fabrication stresses without loss of adhesion to the substrate.

11. A coating composition as recited in claim 10 in which said alkylene monoxide is propylene oxide and said reaction product of said oxide and hydroxyalkylacrylate containing an average of from 2-10 ether groups per molecule is utilized in an amount of 40-80% of the weight of the mixture of unsaturated compounds.

12. A coating composition as recited in claim 11 in which said polyacrylate is hydroxy functional.

13. A coating composition as recited in claim 12 in which said polyacrylate is chosen from the group consisting of trimethylolpropanedicarylate, trimethylolpropanetriacrylate and pentaerythritol polyacrylate containing from 2.5-3.5 acrylate groups per molecule.

14. A coating composition as recited in claim 11 in which said aminoplast is present in an amount of from 3-20%, based on the total weight of ethylenically unsaturated material.

* * * * *